US011396987B2

(12) United States Patent
Iseki et al.

(10) Patent No.: US 11,396,987 B2
(45) Date of Patent: Jul. 26, 2022

(54) LAMP UNIT AND METHOD FOR MANUFACTURING LAMP UNIT

(71) Applicant: MURAKAMI CORPORATION, Shizuoka (JP)

(72) Inventors: Kota Iseki, Shizuoka (JP); Dinh Dong Van, Shizuoka (JP); Kosuke Muto, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 17/121,999

(22) Filed: Dec. 15, 2020

(65) Prior Publication Data

US 2021/0190283 A1    Jun. 24, 2021

(30) Foreign Application Priority Data

Dec. 18, 2019  (JP) .............................. JP2019-228598

(51) Int. Cl.
*B60Q 3/00*         (2017.01)
*F21S 41/19*        (2018.01)
(Continued)

(52) U.S. Cl.
CPC .............. *F21S 41/192* (2018.01); *B60R 1/06* (2013.01); *B60R 1/1207* (2013.01); *F21S 41/29* (2018.01); *F21S 45/50* (2018.01); *F21Y 2115/10* (2016.08)

(58) Field of Classification Search
CPC .......... F21S 41/192; F21S 41/29; F21S 45/50; F21S 43/14; F21S 41/25; F21S 43/26; F21S 41/19; F21S 43/19; F21S 43/145; F21S 43/237; F21S 43/245; F21S 43/27; F21S 43/16; F21S 43/235; F21S 43/249; F21S 43/33; F21S 43/50; B60R 1/06; B60R 1/1207; B60R 2011/004; F21Y 2115/10; F21Y 2107/90; F21K 9/00; F21K 9/23; F21K 9/20; F21V 19/001; F21V 15/01; F21V 15/005; F21V 27/02; F21V 31/00; F21V 13/04; F21V 17/002; F21W 2111/00; F21W 2111/04; F21W 2103/00;
(Continued)

(56) References Cited

U.S. PATENT DOCUMENTS 5,365,411 A * 11/1994 Rycroft ................... G09F 13/22
                                                     362/20
6,241,836 B1 * 6/2001 Skirha ................. B29C 66/9241
                                                     156/73.5
(Continued)

FOREIGN PATENT DOCUMENTS

CN    109882795 A  * 6/2019 .............. F21S 43/19
JP    2012-192879    10/2012

*Primary Examiner* — Omar Rojas Cadima
(74) *Attorney, Agent, or Firm* — Greenblum & Bernstein, P.L.C.

(57) ABSTRACT

A lamp unit according to an embodiment is a lamp unit that irradiates with light from a light source, and includes: a circuit board on which the light source is mounted; a housing configured to have an internal space for accommodating the circuit board; a lens configured to be attached to the housing and emit the light from the light source to the outside of the housing, wherein the housing include an insertion hole for inserting the circuit board into the internal space from the outside of the housing to which the lens is attached.

20 Claims, 7 Drawing Sheets

(51) Int. Cl.
  *B60R 1/12*   (2006.01)
  *F21S 45/50*  (2018.01)
  *F21S 41/29*  (2018.01)
  *B60R 1/06*   (2006.01)
  *F21Y 115/10*     (2016.01)

(58) Field of Classification Search
  CPC .... B60Q 1/0094; B60Q 1/263; B60Q 1/2653;
       B60Q 1/2665; B60Q 2400/50; B60Q
       2400/40; B60Q 1/323; B60Q 1/24; B60Q
       1/0023; B60Q 1/2669; B60Q 1/38; B60Q
       1/50; B60Q 1/0017; B60Q 1/22; B60Q
       1/26; B60Q 1/2615; B60Q 1/2696; B60Q
       1/32; B60Q 1/34; B60Q 1/484; B60Q
       1/525; B60Q 3/12; B60Q 3/20; B60Q
       3/44; B60Q 9/002; B60Q 9/008; B60Q
       1/0011; B60Q 1/28; B60Q 2900/10;
       B60Q 9/00; B62J 11/19; B62J 6/05;
       B60K 2370/797; G09F 13/00; G09F
       2013/05; Y10S 362/812
  See application file for complete search history.

(56) References Cited

U.S. PATENT DOCUMENTS

| | | | | |
|---|---|---|---|---|
| 6,612,725 | B2* | 9/2003 | Camarota | F21V 19/02 362/372 |
| 8,898,940 | B1* | 12/2014 | Hasan | G08B 7/062 40/570 |
| 2010/0079697 | A1* | 4/2010 | Park | G02F 1/133615 349/58 |
| 2017/0146213 | A1* | 5/2017 | Kosugi | F21S 43/14 |

\* cited by examiner

*Fig.7*
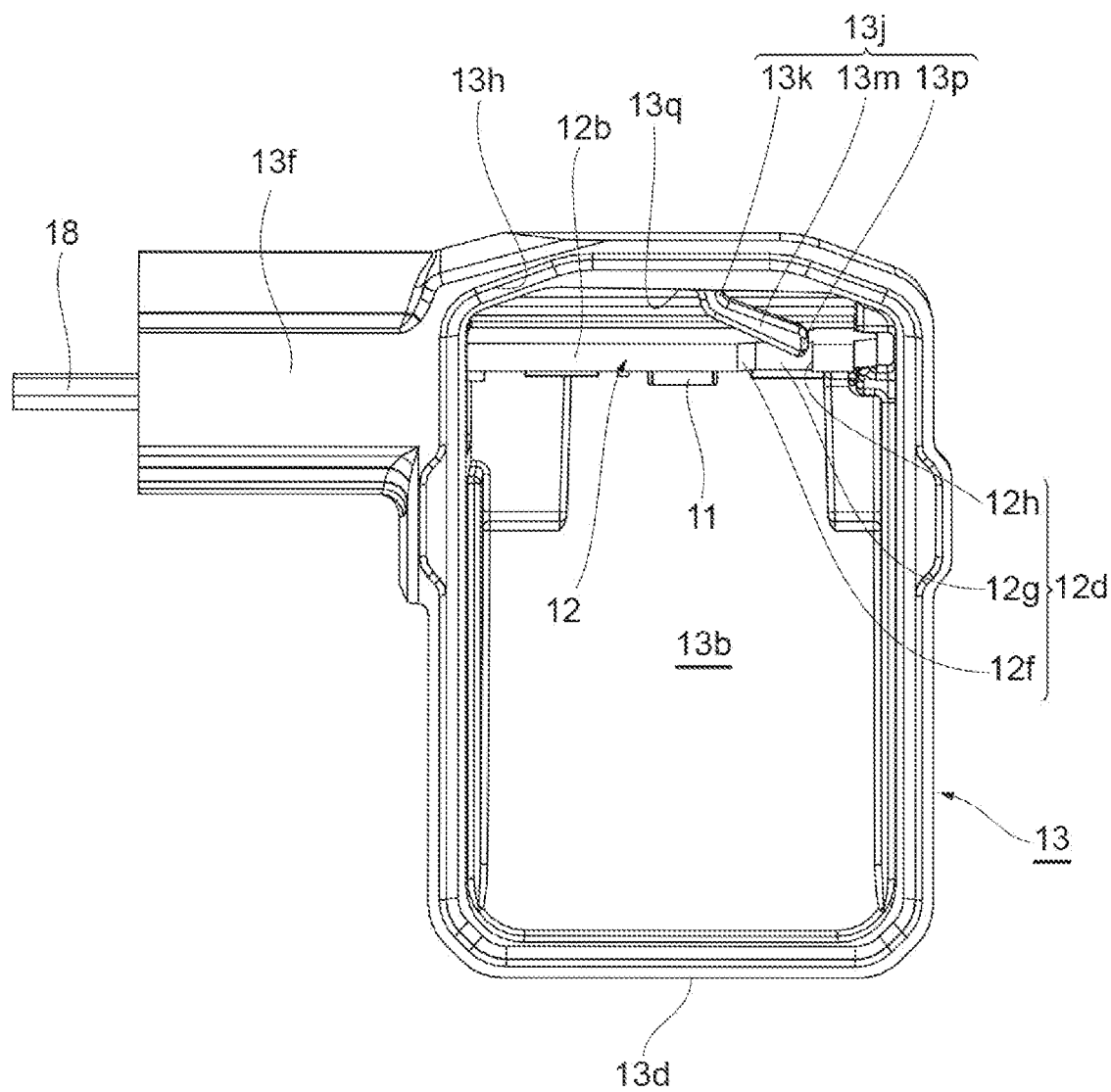
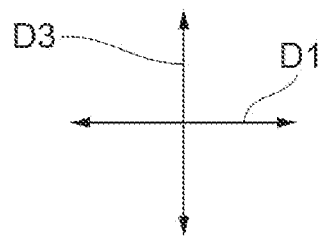

LAMP UNIT AND METHOD FOR MANUFACTURING LAMP UNIT

TECHNICAL FIELD

The present disclosure relates to a lamp unit and a method for manufacturing the lamp unit.

BACKGROUND

Conventionally, various lamp units have been known. Japanese Unexamined Patent Publication No. 2012-192879 describes a lamp unit that is fixed by being attached to a back surface of a reflection mirror. The reflection mirror has a light transmitting portion that transmits light and a light non-transmitting portion that reflects the light. The light transmitting portion is formed of transparent glass, and the light not-transmitting portion is formed by depositing a reflective film on a back surface of the transparent glass. The light transmitting portion is formed by peeling the reflective film from the transparent glass by a blast treatment.

The lamp unit includes a circuit board to which a first LED and a second LED are fixed, a lamp housing having an opening for accommodating the circuit board, and a plate-shaped light diffusing portion that is attached to a periphery of the opening of the lamp housing and seals the opening of the lamp housing that accommodates the circuit board. The light diffusing portion is attached to a reflective film provided on a back surface of the reflection mirror via a cushion tape. The light from the first LED and the second LED is emitted to the outside of the reflection mirror through the light diffusing portion and the light transmitting portion of the reflection mirror.

In the lamp unit, the circuit board in which the first LED and the second LED are fixed is accommodated inside the lamp housing. A power supply to the first LED and the second LED is performed from a feeding wiring extending from the lamp housing. The feeding wiring is electrically connected to the first LED and the second LED by passing a connector provided at a tip of the feeding wiring through a notch formed in the lamp housing and inserting the connector into a connector receiving portion of the circuit board.

SUMMARY

In the lamp unit described above, after the circuit board to which the feeding wiring and the connector are connected is accommodated in the lamp housing, the light diffusing portion is fixed to the lamp housing by welding. Since heat and vibration are applied to the welding of the light diffusing portion to the lamp housing, the heat and vibration applied to the circuit board may cause solder cracks or damage to electronic components on the circuit board. In addition, local heat applied to the circuit board may cause deformation of the circuit board due to residual stress.

In addition, annealing treatment may be performed to suppress the deformation of the circuit board due to the residual stress. In the annealing treatment, the lamp housing accommodating the circuit board and the light diffusing portion are heated for a certain period of time. Even when the annealing treatment is performed, the heat is applied to the circuit board, so that the solder cracks and the like may still occur on the circuit board. Therefore, there is room for improvement in terms of the quality of the lamp unit. Further, in the annealing treatment, since the lamp housing is put into a furnace together with the feeding wiring, the number of lamp units that can be put into the furnace is limited. Therefore, there is room for improvement in terms of manufacturing efficiency.

It is an object of the present disclosure to provide a lamp unit and a method for manufacturing the lamp unit capable of improving quality and being efficiently manufactured.

A lamp unit according to one aspect of the present disclosure is a lamp unit that irradiates with light from a light source, and includes: a circuit board on which the light source is mounted; a housing configured to have an internal space for accommodating the circuit board; a lens configured to be attached to the housing and emit the light from the light source to the outside of the housing, in which the housing includes an insertion hole for inserting the circuit board into the internal space from the outside of the housing to which the lens is attached.

The lamp unit has the housing in which the internal space for accommodating the circuit board on which the light source is mounted is formed, and the housing has the insertion hole for inserting the circuit board into the internal space from the outside of the housing to which the lens is attached. Therefore, in the lamp unit, since the lens can be attached to the housing before the circuit board is inserted into the insertion hole, heat and vibration can be prevented from being applied to the circuit board. Therefore, since it is possible to prevent solder cracks from occurring in the circuit board and damage to electronic components mounted on the circuit board, the quality of the lamp unit can be improved. In addition, when the lamp unit is subjected to an annealing treatment, only the lens and the housing can be annealed before the circuit board is inserted, so that the number of lamp units that can be placed in a furnace can be increased. Therefore, since more lamp units can be manufactured by one annealing treatment, the lamp unit can be manufactured efficiently.

The circuit board may have an engaging portion that engages with the housing in the internal space, and the housing may have an engaged portion on which the engaging portion is caught in the internal space. In this case, the engaging portion of the circuit board inserted into the internal space of the housing via the insertion hole engages with the engaged portion of the housing. Therefore, since the circuit board can be inserted from the insertion hole and the engaging portion can be easily engaged with the engaged portion of the housing, the lamp unit can be easily assembled. Therefore, the lamp unit can be manufactured more efficiently.

The lamp unit includes a feeding harness configured to extend from the circuit board; and a tubular grommet configured to have a hole where the circuit board and the harness are inserted, in which the grommet seals the insertion hole in a state in which the circuit board is inserted into the internal space. In this case, the grommet seals the insertion hole of the housing in a state in which the circuit board is accommodated in the internal space of the housing. Therefore, when the grommet seals the insertion hole, it is possible to suppress an intrusion of water or the like into the internal space of the housing, so that a waterproof effect can be exhibited. In addition, by pushing the grommet into the insertion hole in the state in which the circuit board is inserted into the internal space, since the grommet can be mounted at the same time as the circuit board is mounted, the lamp unit can be easily assembled.

A method for manufacturing a lamp unit according to one aspect of the present disclosure is a method for manufacturing a lamp unit that irradiates with light from a light source, and includes: a process of attaching a lens that emits the light from the light source to the outside of a housing to the housing of the lamp unit; and a process of inserting a circuit board on which the light source is mounted into an internal space of the housing from the outside of the housing through an insertion hole formed in the housing after the lens is attached to the housing.

In the method for manufacturing the lamp unit, the lens is preliminarily attached to the housing of the lamp unit in the process of attaching the lens. After that, the circuit board on which the light source is mounted is inserted from the outside through the insertion hole into the internal space of the housing to which the lens is preliminarily attached. Therefore, since the lens is attached to the housing before the circuit board is inserted into the insertion hole, heat and vibration cannot be applied to the circuit board when the lens is attached to the housing. As a result, as in the case of the lamp unit described above, since damage to the circuit board is avoided, the quality of the lamp unit can be improved. In addition, since only the housing and the lens can be annealed when the lens is attached to the housing, the number of lamp units to be put in a furnace at the time of an annealing treatment can be increased. Therefore, since more lamp units can be manufactured by one annealing treatment, the manufacturing can be efficiently performed.

According to the present disclosure, the quality can be improved and the manufacturing can be efficiently performed.

BRIEF DESCRIPTION OF THE DRAWINGS

FIG. 7 is a plan view illustrating the housing and the circuit board of FIG. 6.

DETAILED DESCRIPTION

Figure 1:
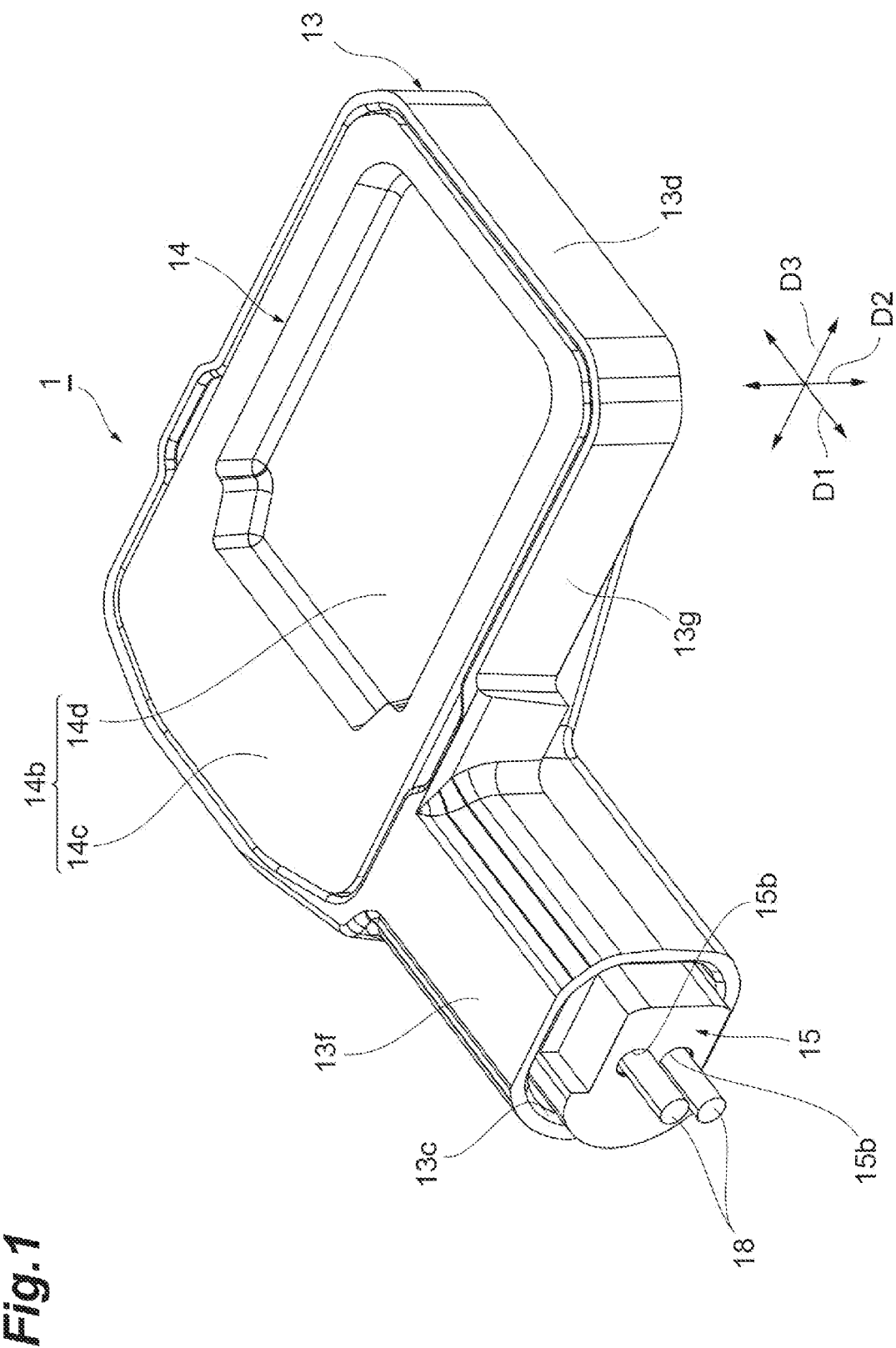
FIG. 1 is a perspective view illustrating an exemplary lamp unit according to an embodiment of the present disclosure.

Hereinafter, embodiments of a lamp unit according to the present disclosure will be described with reference to the drawings. In the description of the drawings, the same or corresponding elements are designated by the same reference numerals, and a duplicated description will be omitted as appropriate. In addition, the drawings are partially simplified or exaggerated for easy understanding, and the dimensional ratios and the like are not limited to those described in the drawings.

A lamp unit 1 according to the present embodiment constitutes a BSM unit as an example. The BSM unit constituted by the lamp unit 1 is attached to, for example, an outer mirror provided on a vehicle body of a vehicle. As a specific example, the BSM unit constituted by the lamp unit 1 is a mirror-mounted BSM, but may be a visor side surface BSM provided on a side surface of a visor of the outer mirror facing a vehicle body side. In this case, for example, the BSM unit including the lamp unit 1 can be visually recognized by a driver sitting in a driver's seat, and the lamp unit 1 can be illuminated to alert the driver when another vehicle approaches.

Figure 2:
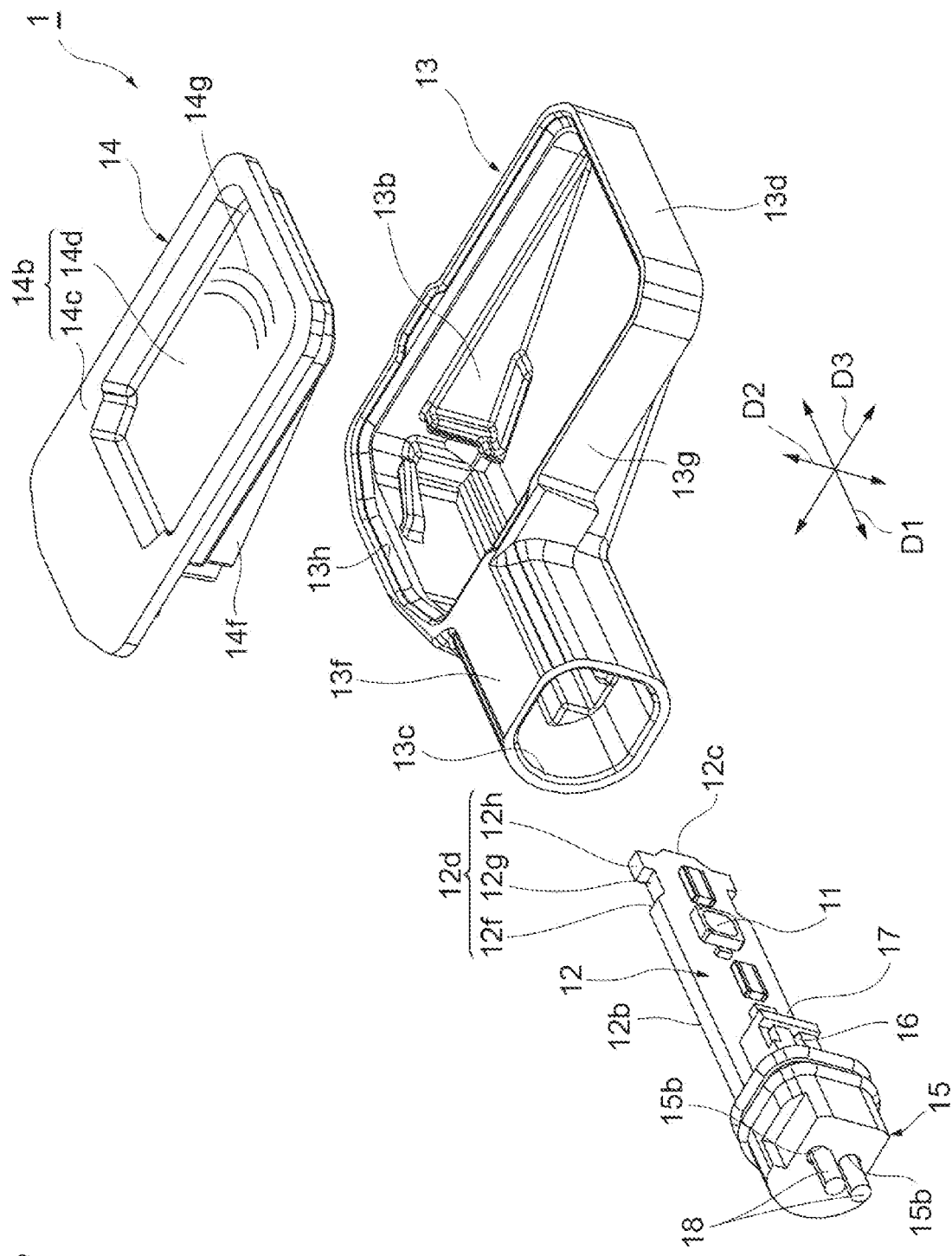
FIG. 2 is an exploded perspective view of the lamp unit of FIG. 1.

FIG. 1 is a perspective view illustrating the lamp unit 1 according to the present embodiment. FIG. 2 is an exploded perspective view of the lamp unit 1. The lamp unit 1 includes a light source 11, a circuit board 12 on which the light source 11 is mounted, a housing 13 having an internal space 13b for accommodating the light source 11 and the circuit board 12, a lens 14 that emits light from the light source 11 to the outside of the housing 13, and a grommet 15 that seals the internal space 13b.

The lamp unit 1 irradiates with the light from the light source 11. The light source 11 is, for example, an LED light source. The circuit board 12 has, for example, a plate shape having a long side 12b extending in a first direction D1 and a short side 12c extending in a second direction D2 intersecting the first direction D1. The circuit board 12 has a plate shape that extends to be long in the first direction D1, and has a thickness in a third direction D3 that intersects both the first direction D1 and the second direction D2.

The housing 13 has an insertion hole 13c into which the circuit board 12 is inserted. The insertion hole 13c communicates with the internal space 13b of the housing 13. The insertion hole 13c is a hole through which the circuit board 12 is passed when the circuit board 12 is accommodated in the internal space 13b of the housing 13. The insertion hole 13c is a hole into which the circuit board 12 is inserted into the internal space 13b from the outside of the housing 13 to which the lens 14 is attached. Therefore, the maximum value of an interval of the insertion hole 13c in the second direction D2 is larger than the maximum value of a length of the circuit board 12 in the second direction D2. In the present embodiment, the above-mentioned "interval" indicates a width of the space in which the circuit board 12 enters.

The light source 11 is mounted on one side of the circuit board 12 in the first direction D1. On the other side of the circuit board 12 in the first direction D1, a connector portion 16 and a receptacle portion 17 that accommodates the connector portion 16 are mounted. A feeding harness 18 electrically connected to the light source 11 via the circuit board 12 extends from the connector portion 16. The grommet 15 has a small hole 15b through which the harness 18 is inserted, and the harness 18 extends from the small hole 15b of the grommet 15 to the outside of the lamp unit 1 along the first direction D1.

The housing 13 has a box-shaped portion 13d in which the internal space 13b is formed, and a tubular portion 13f that protrudes from the box-shaped portion 13d in the first direction D1 and has an insertion hole 13c formed inside. The box-shaped portion 13d has a box shape extending in both the first direction D1 and the third direction D3 and having a thickness in the second direction D2.

The tubular portion 13f protrudes from one side (left side in FIGS. 1 and 2) of the third direction D3 on a side surface 13g of the box-shaped portion 13d facing the first direction D1. The lens 14 is attached to the box-shaped portion 13d of the housing 13. The box-shaped portion 13d has a frame-shaped opening 13h extending in both the first direction D1 and the third direction D3 and facing the second direction D2, and the internal space 13b and the opening 13h are sealed by the lens 14. The lens 14 functions as, for example, a transparent cover.

Figure 3:
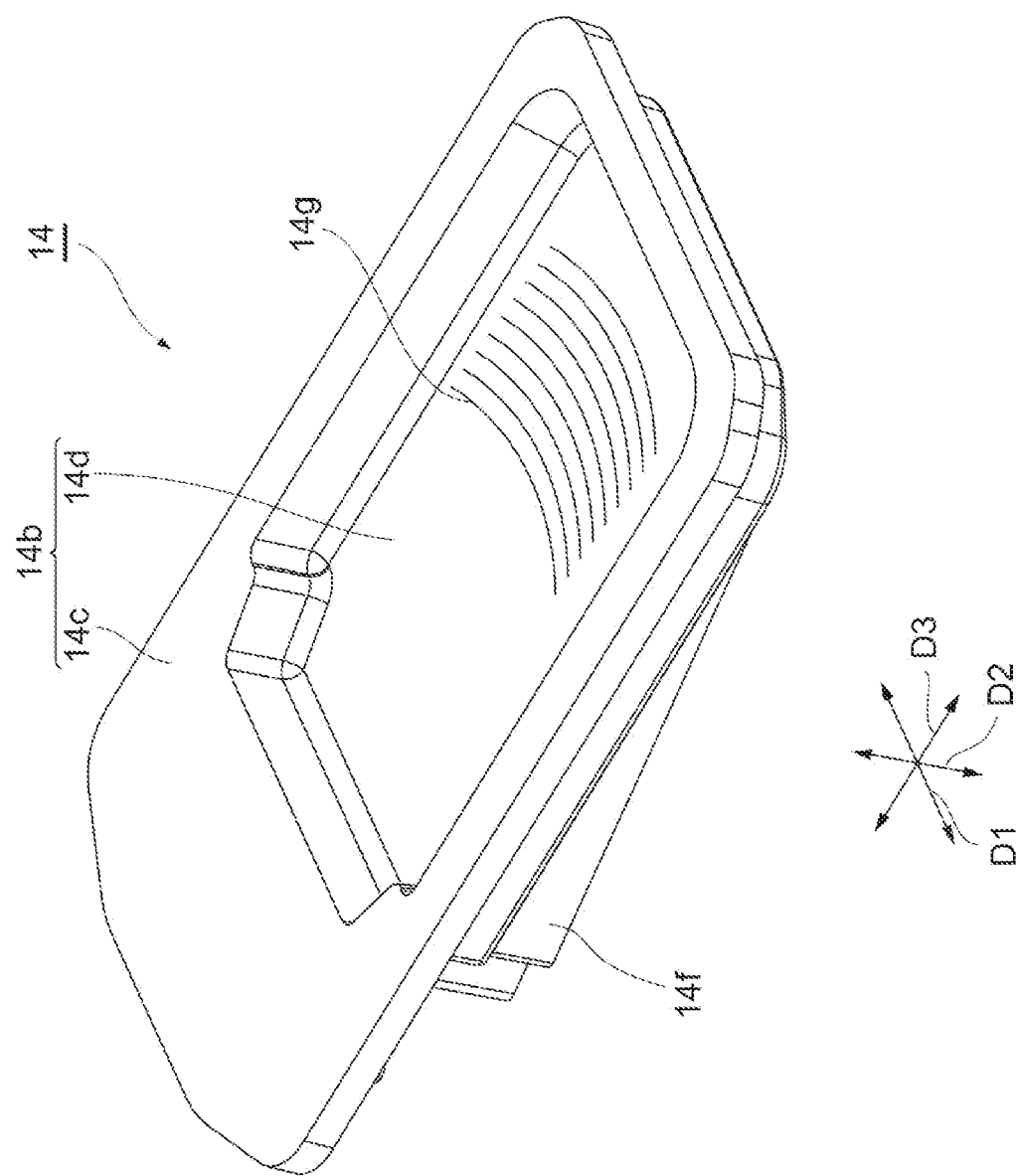
FIG. 3 is a perspective view illustrating an exemplary lens of the lamp unit of FIG. 1.

FIG. 3 is a perspective view illustrating the lens 14. As illustrated in FIG. 3, the lens 14 exhibits a plate shape extending in both the first direction D1 and the third direction D3. The lens 14 emits the light from the light source 11 to the outside of the lamp unit 1. For example, the lens 14 has an exposure surface 14b exposed to the outside of the lamp unit 1. The exposure surface 14b is exposed to the side surface of the visor of the outer mirror, as an example. For example, the exposure surface 14b includes a first exposure surface 14c extending in both the first direction D1 and the third direction D3, and a second exposure surface 14d recessed in the second direction D2 in the first exposure surface 14c.

The lens 14 has a convex portion 14f protruding in the second direction D2 on an opposite side (lower side in FIG. 3) of the second exposure surface 14d. For example, a protruding height of the convex portion 14f decreases from one side (left side in FIG. 3) to the other side (right side in FIG. 3) of the third direction D3. Therefore, a top surface of the convex portion 14f is inclined with respect to a plane extending in both the first direction D1 and the third direction D3.

For example, a lens cut 14g is formed on at least one of the top surface of the convex portion 14f and the second exposure surface 14d. As an example, the lens cut 14g includes a plurality of unevennesses arranged along the third direction D3, and each of the plurality of unevennesses extends in an arc shape. However, the shape and arrangement of the lens cut 14g are not limited to the above examples and can be changed as appropriate.

Since the second exposure surface 14d of the lens 14 corresponds to an emitting portion from which the light emitted from the light source 11 is emitted, and the lens 14 includes the lens cut 14g, the diffused light diffused by the lens cut 14g is output from the second exposure surface 14d. In this way, since the diffused light is emitted from the lamp unit 1 by the lens cut 14g, the lamp unit 1 can be easily and visually recognized.

Figure 4:
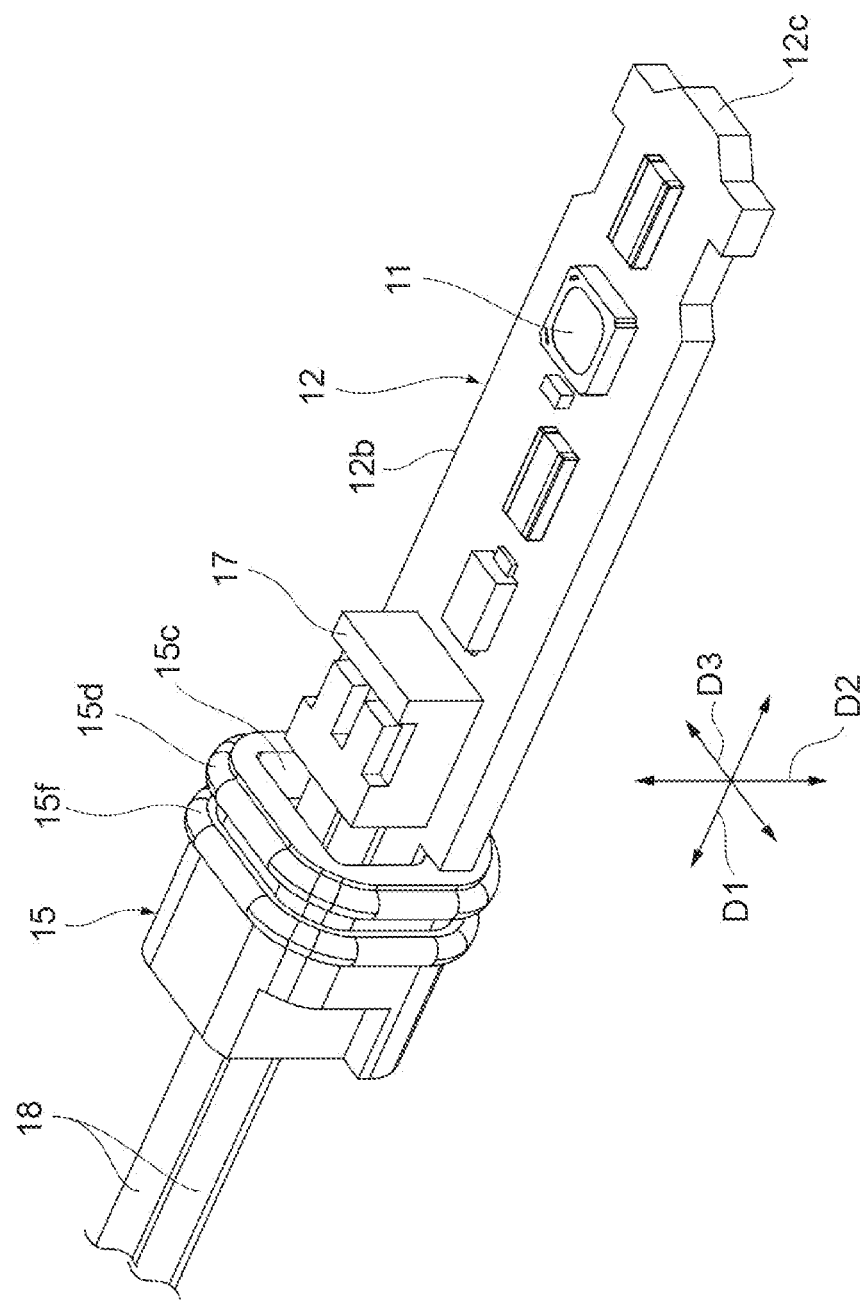
FIG. 4 is a perspective view illustrating an exemplary circuit board, grommet, and feeding harness of the lamp unit of FIG. 1.

FIG. 4 is a perspective view illustrating the circuit board 12 on which the light source 11 is mounted, the grommet 15, and the harness 18. As illustrated in FIG. 4, the grommet 15 has a hole portion 15c where a portion of the circuit board 12 and the harness 18 are inserted, and the hole portion 15c communicates with the small hole 15b described above. A width of the hole portion 15c is, for example, about the same as a width of an end portion of the circuit board 12 in the first direction D1. Therefore, it is possible to fit the circuit board 12 into the hole portion 15c.

The grommet 15 has an annular convex portion 15d extending in the second direction D2 and the third direction D3. An outer diameter of the annular convex portion 15d is about the same as an inner diameter of the insertion hole 13c of the housing 13. Therefore, when the circuit board 12 is inserted into the insertion hole 13c and the grommet 15 is pushed into the insertion hole 13c, the annular convex portion 15d of the grommet 15 comes into close contact with an inner surface of the insertion hole 13c. Such a close contact ensures watertightness inside the housing 13.

The grommet 15 includes, for example, an annular convex portion 15f in addition to the annular convex portion 15d. The annular convex portion 15d and the annular convex portion 15f are arranged along the first direction D1, and the annular convex portion 15f is in close contact with the inner surface of the insertion hole 13c of the housing 13 together with the annular convex portion 15d. Therefore, the watertightness of the housing 13 is more reliably ensured.

Figure 5:
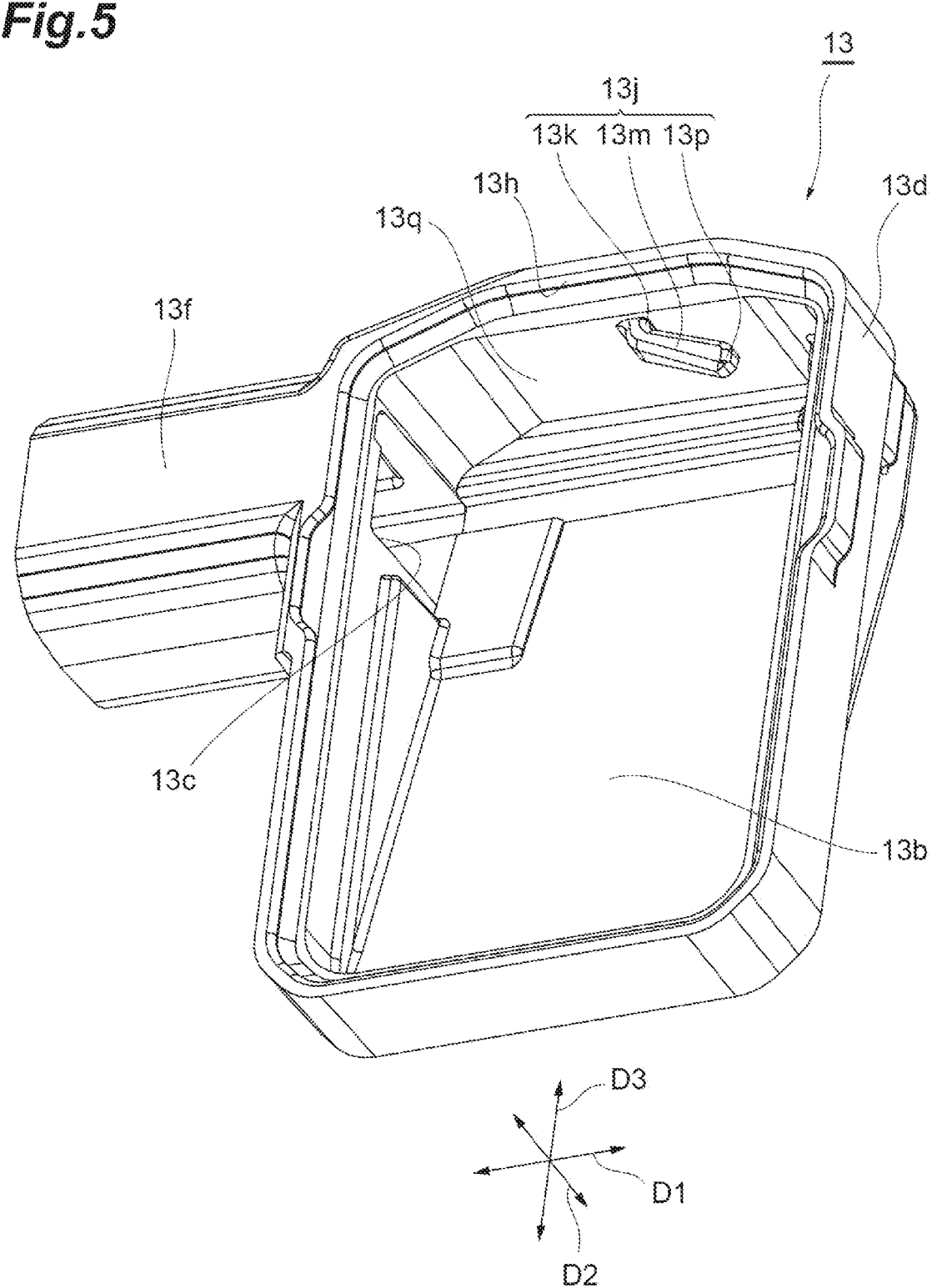
FIG. 5 is a perspective view illustrating a housing of the lamp unit of FIG. 1.

FIG. 5 is a perspective view illustrating the housing 13. An inner surface 13q of the box-shaped portion 13d of the housing 13 is provided with an engaged portion 13j to which the circuit board 12 inserted into the insertion hole 13c and accommodated in the internal space 13b engages. The inner surface 13q is a surface formed along the insertion hole 13c and extends in both the first direction D1 and the second direction D2. For example, a depth of a bottom surface of the box-shaped portion 13d of the housing 13 becomes deeper as it approaches the inner surface 13q.

The engaged portion 13j is a rod-shaped portion that protrudes obliquely from the inner surface 13q. As a result, the engaged portion 13j has a shape that easily bends in the third direction D3. The engaged portion 13j is provided, for example, near the center of the inner surface 13q in the first direction D1. The engaged portion 13j has, for example, a base portion 13k, a rod-shaped portion 13m extending obliquely from the base portion 13k, and a tip portion 13p positioned on the rod-shaped portion 13m opposite to the base portion 13k. For example, the rod-shaped portion 13m may extend obliquely away from the insertion hole 13c, and the tip portion 13p may be rounded.

Figure 6:
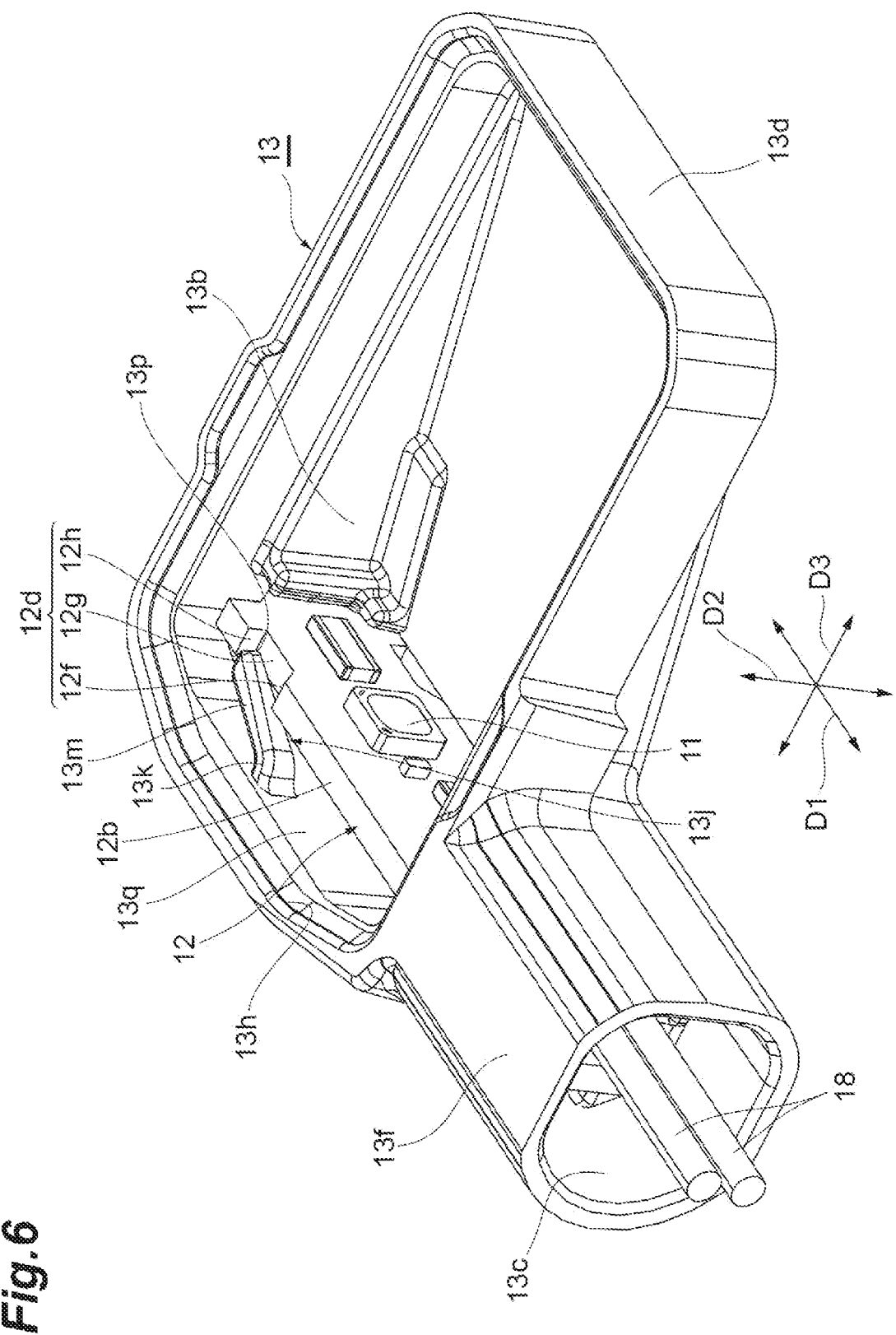
FIG. 6 is a perspective view illustrating a state in which the circuit board is inserted into an internal space of the housing of FIG. 5.

FIG. 6 is a perspective view illustrating the circuit board 12 engaged with the engaged portion 13j of the housing 13. FIG. 7 is a plan view (viewed along the second direction D2) illustrating the circuit board 12 engaged with the engaged portion 13j of the housing 13. As illustrated in FIGS. 6 and 7, the circuit board 12 includes an engaging portion 12d that engages the engaged portion 13j of the housing 13. Note that in FIGS. 6 and 7, the grommet 15 is not illustrated.

The engaging portion 12d is formed in a concave shape on the end surface of the circuit board 12 facing the second direction D2, for example. As an example, the engaging portion 12d is provided on a tip side of the circuit board 12 in an insertion direction (right direction in FIG. 7) with respect to the center of the first direction D1 of the circuit board 12. The engaging portion 12d has, for example, an inclined surface 12f that is recessed obliquely from an end surface facing the second direction D2, a bottom surface 12g that is continuous with the inclined surface 12f, and a wall portion 12h that stands up from the bottom surface 12g on an opposite side of the inclined surface 12f.

When the circuit board 12 is inserted into the internal space 13b through the insertion hole 13c with respect to the housing 13, a surface of the circuit board 12 opposite to the mounting surface of the light source 11 comes into contact with the rod-shaped portion 13m of the engaged portion 13j, and the engaged portion 13j bends in the third direction D3. At this time, the engaged portion 13j is elastically deformed in a direction approaching the inner surface 13q.

Then, when the circuit board 12 is further inserted into the insertion hole 13c, the elastic deformation is released by the rod-shaped portion 13m entering the concave-shaped engaging portion 12d. At this time, the tip portion 13p of the engaged portion 13j faces the wall portion 12h of the engaging portion 12d along the first direction D1, so that even if the circuit board 12 is pulled, the wall portion 12h comes into contact with the tip portion 13p and the disconnection is suppressed. Since the engaging portion 12d is caught and engaged with the engaged portion 13j in this way, the engaged portion 13j and the engaging portion 12d can function as a retainer for the circuit board 12. Note that the shapes of the engaging portion 12d and the engaged portion 13j are not limited to the above examples and can be changed as appropriate.

Next, a method of manufacturing the lamp unit according to the present embodiment will be described. An example of assembling the lamp unit 1 described above will be described below. For example, as illustrated in FIG. 2, in a state in which the circuit board 12, the housing 13, the lens 14, and the grommet 15 are disassembled, first, the lens 14 is attached to the housing 13 before the circuit board 12 is inserted into the housing 13 (process of attaching the lens).

For example, the lens 14 is fixed to the housing 13 by placing the lens 14 on the opening 13h of the housing 13 and welding the lens 14 to the housing 13. As a specific example, after the lens 14 is placed on the opening 13h of the housing 13, the housing 13 and the lens 14 are heated and vibrated to perform the welding. In addition, the housing 13 and the lens 14 may be annealed. In this case, the housing 13 and the lens 14 are placed in a furnace and heated.

On the other hand, the circuit board 12 on which the light source 11 and the receptacle portion 17 are mounted, the connector portion 16 is inserted into the receptacle portion 17, and the harness 18 is connected is passed through the hole portion 15c of the grommet 15. Then, the circuit board 12 is inserted from the outside of the housing 13 into the insertion hole 13c of the housing 13 to which the lens 14 is attached (process of inserting the circuit board).

When the circuit board 12 is inserted into the insertion hole 13c of the housing 13, the circuit board 12 elastically deforms the engaged portion 13j of the housing 13 in the direction approaching the inner surface 13q as illustrated in FIGS. 6 and 7, and then, the engaged portion 13j enters the engaging portion 12d of the circuit board 12, and the circuit board 12 engages with the housing 13. The circuit board 12 inserted into the insertion hole 13c of the housing 13 is neither heated nor vibrated, for example. After the circuit board 12 is inserted into the insertion hole 13c of the housing 13 and engaged with the engaged portion 13j, a series of processes for manufacturing the lamp unit 1 is completed.

Next, the action and effect obtained from the lamp unit 1 and the manufacturing method according to the present embodiment will be described. The lamp unit 1 has the housing 13 in which the internal space 13b for accommodating the circuit board 12 on which the light source 11 is mounted is formed, and the housing 13 has the insertion hole 13c for inserting the circuit board 12 into the internal space 13b from the outside of the housing 13 to which the lens 14 is attached. Therefore, in the lamp unit 1, since the lens 14 can be attached to the housing 13 before the circuit board 12 is inserted into the insertion hole 13c, the heat and vibration can be prevented from being applied to the circuit board 12.

Therefore, since it is possible to prevent solder cracks from occurring in the circuit board 12 and damage to the electronic components mounted on the circuit board 12, the quality of the lamp unit 1 can be improved. In addition, when the lamp unit 1 is subjected to the annealing treatment, only the lens 14 and the housing 13 can be annealed before the circuit board 12 is inserted, so that the number of lamp units 1 that can be placed in the furnace can be increased. Therefore, since more lamp units 1 can be manufactured by one annealing treatment, the lamp unit 1 can be manufactured efficiently.

In addition, the circuit board 12 may have the engaging portion 12d that engages with the housing 13 in the internal space 13b, and the housing 13 may have the engaged portion 13j on which the engaging portion 12d is caught in the internal space 13b. In this case, the engaging portion 12d of the circuit board 12 inserted into the internal space 13b of the housing 13 via the insertion hole 13c engages with the engaged portion 13j of the housing 13. Therefore, since the circuit board 12 can be inserted from the insertion hole 13c and the engaging portion 12d can be easily engaged with the engaged portion 13j of the housing 13, the lamp unit 1 can be easily assembled. Therefore, the lamp unit 1 can be manufactured more efficiently.

As illustrated in FIGS. 1 and 2, the lamp unit 1 includes the feeding harness 18 extending from the circuit board 12 and the grommet 15 where the circuit board 12 and the harness 18 are inserted, and the grommet 15 may seal the insertion hole 13c with the circuit board 12 inserted into the internal space 13b. In this case, the grommet 15 seals the insertion hole 13c of the housing 13 in a state in which the circuit board 12 is accommodated in the internal space 13b of the housing 13.

Therefore, when the grommet 15 seals the insertion hole 13c, it is possible to suppress an intrusion of water or the like into the internal space 13b of the housing 13, so that a waterproof effect can be exhibited. In addition, by pushing the grommet 15 into the insertion hole 13c in the state in which the circuit board 12 is inserted into the internal space 13b, since the grommet 15 can be mounted at the same time as the circuit board 12 is mounted, the lamp unit 1 can be easily assembled.

In the method for manufacturing the lamp unit according to the present embodiment, the lens 14 is preliminarily attached to the housing 13 of the lamp unit 1 in the process of attaching the lens. After that, the circuit board 12 on which the light source 11 is mounted is inserted from the outside through the insertion hole 13c into the internal space 13b of the housing 13 to which the lens 14 is preliminarily attached.

Therefore, since the lens 14 is attached to the housing 13 before the circuit board 12 is inserted into the insertion hole 13c, the heat and vibration are not applied to the circuit board 12 when the lens 14 is attached to the housing 13. As a result, since damage to the circuit board 12 is avoided, the quality of the lamp unit 1 can be improved. In addition, since only the housing 13 and the lens 14 can be annealed when the lens 14 is attached to the housing 13, the number of lamp units 1 to be put in the furnace at the time of the annealing treatment can be increased. Therefore, since more lamp units 1 can be manufactured by one annealing treatment, the manufacturing can be performed efficiently.

The embodiment of the lamp unit according to the present disclosure has been described above. However, the present disclosure is not limited to the above-described embodiment, and may be modified or applied to other things without changing the gist described in each claim. That is, the shape, size, material, number, and arrangement of each portion of the lamp unit according to the present disclosure, and the content and order of each process of the method for manufacturing the lamp unit can be appropriately changed within the scope of the above gist.

For example, in the above-described embodiment, the lamp unit 1 that constitutes the BSM unit and is attached to the side surface of the visor of the outer mirror facing the vehicle body side has been described. However, the lamp unit according to the present disclosure may be a lamp unit attached to something other than the outer mirror, and can be applied to something other than the BSM unit, and further to something other than the vehicle body.

What is claimed is:
1. A lamp unit of an outer mirror of a vehicle body, the lamp unit comprising:
   a light source that emits light;
   a circuit board on which the light source is mounted, wherein the circuit board has a plate shape with a long side extending in a first direction, a short side extending in a second direction intersecting the first direction, and a thickness extending in a third direction intersecting the first direction and the second direction;

a housing configured to have an internal space for accommodating the circuit board and be installed on an exterior of the vehicle body; and
a lens configured to be attached to the housing and emit the light from the light source to an outside of the housing along the second direction,
the housing comprises:
   a box-shaped portion in which the internal space is formed; and
   a tubular portion that protrudes from the box-shaped portion in the first direction and has an insertion hole for inserting the circuit board into the internal space along the first direction from the outside of the housing in a state in which the lens is attached to the housing,
   wherein a first distance between two opposing exterior walls of the box-shaped portion is larger than a second distance between two opposing exterior walls of the tubular portion, and
   wherein the first distance and the second distance extend in the third direction; and
wherein the circuit board comprises an engaging portion as a part of the circuit board which engages with the housing in the internal space,
wherein the housing comprises an engaged portion with which the circuit board engages in the internal space, and
wherein the engaging portion engages with the engaged portion to prevent movement of the circuit board in the first direction.

2. The lamp unit according to claim 1, further comprising:
a feeding harness configured to extend from the circuit board; and
a tubular grommet configured to have a hole where the circuit board and the harness are inserted,
wherein the grommet seals the insertion hole in a state in which the circuit board is inserted into the internal space.

3. The lamp unit according to claim 2,
wherein the grommet comprises an annular convex portion extending in the second direction and the third direction.

4. The lamp unit according to claim 3,
wherein the grommet further comprises an additional annular convex portion extending in the second direction and the third direction, and
wherein the annular convex portion and the additional annular convex portion are arranged along the first direction.

5. The lamp unit according to claim 1,
wherein the engaging portion has a concave shape on an end surface of the circuit board.

6. The lamp unit according to claim 1,
wherein the engaging portion has a concave shape on an end surface in the long side of the circuit board.

7. The lamp unit according to claim 1,
wherein the engaging portion having a concave shape is provided on a side of a tip of the circuit board in an insertion direction.

8. The lamp unit according to claim 1,
wherein the engaging portion having a concave shape comprises:
   a first surface which is recessed from an end surface in the long side of the circuit board;
   a bottom surface which is continuous to the first surface; and
   a wall portion which stands up from the bottom surface on an opposite side of the first surface.

9. The lamp unit according to claim 1,
wherein the engaging portion having a concave shape comprises:
   an inclined surface which is recessed from an end surface in the long side of the circuit board;
   a bottom surface which is continuous to the inclined surface; and
   a wall portion which stands up from the bottom surface on an opposite side of the inclined surface.

10. The lamp unit according to claim 1,
wherein the engaged portion has a rod shape which protrudes from an inner surface of the housing.

11. The lamp unit according to claim 10,
wherein the engaged portion comprises:
   a base portion;
   a rod-shaped portion extending from the base portion; and
   a tip portion positioned on the rod-shaped portion opposite to the base portion.

12. The lamp unit according to claim 11,
wherein the rod-shaped portion extends away from the insertion hole.

13. The lamp unit according to claim 1,
wherein the engaged portion is configured to be bendable in the third direction, so that the engaged portion is elastically deformed in a direction approaching an inner surface of the housing.

14. The lamp unit according to claim 13,
wherein, when the circuit board is inserted into the internal space of the housing through the insertion hole along the first direction, a surface of the circuit board opposite to a mounting surface of the light source comes into contact with the engaged portion, and the engaged portion bends in the third direction to be elastically deformed in the direction approaching the inner surface of the housing.

15. The lamp unit according to claim 1,
wherein the first direction, the second direction and the third direction are substantially perpendicular to each other.

16. The lamp unit according to claim 1,
wherein the first direction, the second direction and the third direction are perpendicular to each other.

17. A method for manufacturing a lamp unit of an outer mirror of a vehicle body, the method comprising:
providing a light source that emits light;
a process of attaching a lens that emits the light along a second direction from the light source to an outside of a housing to the housing of the lamp unit,
the housing being provided with an internal space for accommodating a circuit board, and configuring the housing to be installed on an exterior of the vehicle body,
providing the housing with a box-shaped portion in which the internal space is formed and a tubular portion that protrudes from the box-shaped portion in a first direction and has an insertion hole, and providing a first distance between two opposing exterior walls of the box-shaped portion to be larger than a second distance between two opposing exterior walls of the tubular portion, and providing the first distance and the second distance to extend in a third direction that intersects the first direction and the second direction; and
a process of inserting the circuit board on which the light source is mounted into the internal space of the housing along a first direction from the outside of the housing through the insertion hole formed in the housing after the lens is attached to the housing, wherein the circuit board has a plate shape with a long side extending in the first direction, a short side extending in the second direction intersecting the first direction, and a thickness extending in the third direction, wherein the circuit board comprises an engaging portion as a part of the circuit board, and the housing comprises an engaged portion, wherein the process of inserting includes inserting the circuit board into the internal space of the housing so that the engaging portion of the circuit board engages with the engaged portion of the housing in the internal space, and engaging the engaging portion with the engaged portion to prevent movement of the circuit board in the first direction.

18. The method for manufacturing the lamp unit according to claim 17, wherein the engaging portion has a concave shape on an end surface in the long side of the circuit board, wherein the engaged portion has a rod shape which protrudes from an inner surface of the housing, and wherein the process of inserting includes inserting the circuit board into the internal space of the housing so that a surface of the circuit board opposite to a mounting surface of the light source comes into contact with the engaged portion of the rod shape, and the engaged portion of the rod shape bends in the third direction to be elastically deformed in a direction approaching the inner surface of the housing.

19. The method for manufacturing the lamp unit according to claim 18, wherein the engaging portion having the concave shape comprises:
a first surface which is recessed from an end surface in the long side of the circuit board;
a bottom surface which is continuous to the first surface; and
a wall portion which stands up from the bottom surface on an opposite side of the first surface, wherein the engaged portion comprises:
a base portion;
a rod-shaped portion extending from the base portion; and
a tip portion positioned on the rod-shaped portion opposite to the base portion, and wherein the process of inserting includes further inserting the circuit board into the internal space of the housing so that the rod-shaped portion enters the engaging portion of the concave shape, and the tip portion of the engaged portion faces the wall portion of the engaging portion along the first direction.

20. A lamp unit, comprising:
a light source that emits light;
a circuit board on which the light source is mounted, wherein the circuit board has a plate shape with a long side extending in a first direction, a short side extending in a second direction intersecting the first direction, and a thickness extending in a third direction intersecting the first direction and the second direction;
a housing configured to have an internal space for accommodating the circuit board; and
a lens configured to be attached to the housing and emit the light from the light source to an outside of the housing along the second direction,
wherein the housing comprises:
a box-shaped portion in which the internal space is formed; and
a tubular portion that protrudes from the box-shaped portion in the first direction and has an insertion hole for inserting the circuit board into the internal space along the first direction from the outside of the housing in a state in which the lens is attached to the housing,
wherein a first distance between two opposing exterior walls of the box-shaped portion is larger than a second distance between two opposing exterior walls of the tubular portion, and
wherein the first distance and the second distance extend in the third direction,
wherein the circuit board comprises an engaging portion as a part of the circuit board which engages with the housing in the internal space,
wherein the housing comprises an engaged portion with which the circuit board engages in the internal space, and
wherein the engaging portion engages with the engaged portion to prevent movement of the circuit board in the first direction.

* * * * *